(12) United States Patent
Warwick et al.

(10) Patent No.: US 6,460,151 B1
(45) Date of Patent: Oct. 1, 2002

(54) SYSTEM AND METHOD FOR PREDICTING STORAGE DEVICE FAILURES

(75) Inventors: Alan M. Warwick, Bellevue; Dilip C. Naik, Redmond; Peter W. Wieland, Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,566

(22) Filed: Jul. 26, 1999

(51) Int. Cl.[7] ............................. G11C 29/00; H02H 3/05
(52) U.S. Cl. ............................................ 714/718; 714/57
(58) Field of Search ........................... 714/718, 37, 40, 714/42, 46, 47, 48, 54

(56) References Cited

U.S. PATENT DOCUMENTS 4,045,781 A * 8/1977 Levy et al.
4,866,718 A * 9/1989 Fosdick ..................... 714/52
5,828,583 A * 10/1998 Bush et al. ................ 702/185
5,832,199 A * 11/1998 Apperley et al. ............ 714/6

OTHER PUBLICATIONS

Microsoft Windows 95 and Windows NT *Smart IOCTL API Specification*, Compaq Computer Corporation, Microsoft Corporation, Rev. 01.1, Feb. 29, 1996. pp. 1–7.

Mark Evans, ed., *SFF Committee Specification for Self-Monitoring, Analysis and Reporting Technology (S.M.A.R.T.)*, SFF–8035i, Rev. 2.0, Apr. 1, 1996. pp 2, 4–23.

* cited by examiner

*Primary Examiner*—Christine T. Tu
(74) *Attorney, Agent, or Firm*—Christensen, O'Connor Johnson Kindness PLLC

(57) ABSTRACT

A method and system for detecting and reporting storage hardware failure prediction is disclosed. The method and system provide a standardized mechanism for any type of storage device to predict and report storage failures. This includes SMART SCSI devices, SMART ATA/ATAPI devices, non-SMART SCSI devices, non-SMART ATA/ATAPI devices, proprietary storage devices, and others such as CD-ROM drives, DVD ROMs, tape drives, and RAM disks. A device driver obtains failure prediction status information and propagates it to a management application. The information may be propagated via a failure prediction filter driver used to perform statistical analysis or proprietary access to the hardware. In a Windows operating environment, information is propagated from the device driver through a Windows Management Instrumentation component. The Windows Management Instrumentation component bridges the gap across user mode and kernel mode, thereby allowing management applications in user mode to obtain information from device drivers residing in kernel mode. A standardized set of APIs is provided for performing storage device failure prediction.

26 Claims, 8 Drawing Sheets

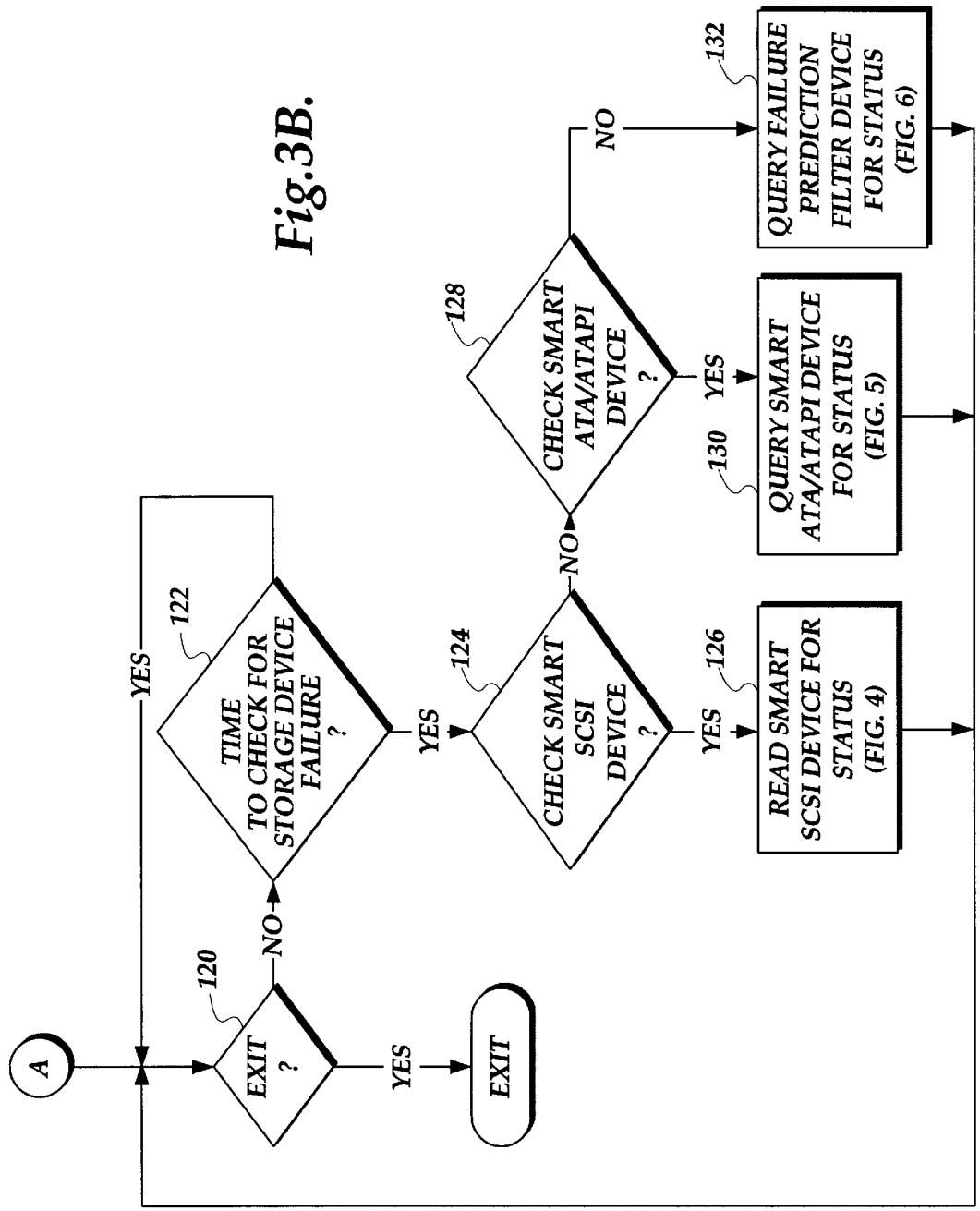

SYSTEM AND METHOD FOR PREDICTING STORAGE DEVICE FAILURES

FIELD OF THE INVENTION

This invention relates generally to the status of computer storage devices, and more particularly to a standardized mechanism for predicting storage device failures.

BACKGROUND OF THE INVENTION

Corporations and other enterprises have a need to monitor the performance and status of elements of their computer networks to prevent data loss and to maximize resource efficiency. The computer industry is addressing this need by putting together the concept of Web-Based Enterprise Management (WBEM). WBEM is an industry initiative for developing a standardized, nonproprietary means for accessing and sharing management information in an enterprise network. The WBEM initiative is intended to solve the problem of collecting end-to-end management and diagnostic data in enterprise networks that may include hardware from multiple vendors, numerous protocols and operating systems, and a legion of distributed applications.

The founding companies of the WBEM initiative developed a prototype set of environment-independent specifications describing how to access any type of management instrumentation. An industry-wide initiative known as the Common Information Model (CIM) was started by a consortium of companies, including Microsoft and Compaq, who voluntarily ceded control of their developed work to the Distributed Management Task Force (DMTF, an industry standards body previously known as the Desktop Management Task Force). The CIM specification describes the modeling language, naming, and mapping techniques used to collect and transfer information from data providers and other management models. Windows Management Instrumentation (WMI) is one implementation of the CIM. WMI provides for developing a standardized technology for accessing management information in enterprise environments.

One component of WMI is the Windows Driver Model (WDM) provider for kernel component instrumentation. The WDM provider interfaces with a kernel mode component that provides services to allow WDM-enabled drivers to implement WMI, and also acts as an interface to the WDM provider that resides in the user mode. WMI uses the WDM provider to publish information, configure device settings, and supply event notification from device drivers.

One of the elements that needs to be monitored is hardware storage devices, such as hard disk drives, floppy disk drives, tape storage devices, CD-ROMs, DVD ROMs and RAM disks. Prediction of storage device failures can be based on a variety of factors, for example, temperature, height of the head to the platter, and number of retries required to perform a read or write operation. Hardware storage devices communicate via device drivers. In the past, prediction and reporting of storage device failures or potential storage device failures was the responsibility of the manufacturer/vendor of the hardware device or the developer of the device driver. If a manufacturer/vendor of a hardware device wanted to include storage failure prediction/reporting, the manufacturer/vendor was responsible for developing the storage device failure application, as well as the details of an application programming interface (API) that other vendors of management applications could use.

Leaving the responsibility of storage device failure prediction to individual manufacturers/vendors of storage devices or developers of device drivers causes several problems. First, writing such an application is a time consuming task for each vendor, which can result in several negative consequences. For example, the vendor may opt not to include a storage device failure prediction application, or a vendor may include a storage device failure prediction application that adds to the cost of the device and is more prone to bugs than using a single mechanism for the reporting of storage device failure prediction. Another problem is that the end result is often an inconsistent user interface and an inconsistent API set for obtaining the information.

Some devices are Self-Monitoring Analysis and Reporting Technology (SMART) system devices. Currently, SMART system devices include some SCSI (Small Computer System Interface) and some ATA/ATAPI (Application Programming Interface first used by the IBM PC AT system) devices. ATA and ATAPI hardware interfaces can be used to communicate with an IDE (Integrated Device Electronics) device. SMART ATA/ATAPI devices follow the Information Technology—AT Attachment with Packet Interface SMART command set specification, which is known in the art. SMART SCSI devices follow the Informational Exceptions Control page specification as defined in the SCSI specification, which is known in the art. SMART devices employ a technology that monitors and predicts device performance and reliability. SMART devices use various diagnostic tests in order to detect problems with devices with the object of increasing productivity and protecting data.

Typical enterprise consumers already have an infrastructure to manage hundreds of servers and thousands of personal computers (PCs). These consumers would like the management application that they are currently using to seamlessly integrate with the storage failure prediction application. In order to accomplish this seamless integration, the vendors of each storage device should be able to propagate storage device failure information to all prominent management application vendors. The existing infrastructure may only be able to report imminent failures in SCSI and ATA/ATAPI devices.

Accordingly, a need exists for a standardized mechanism for predicting and reporting storage device failures. The standardized mechanism should be capable of use with all storage devices, including currently supported SMART devices, currently supported non-SMART devices, and devices that are not currently supported, such as CD-ROMs, DVD ROMS, tape storage devices, or RAM disks.

SUMMARY OF THE INVENTION

The present invention is directed to a computerized method and system for a standardized way of predicting and reporting storage device failures for any type of storage device. The system includes one or more device drivers, one or more storage management drivers, and one or more management applications. Each of the device drivers interfaces with a hardware storage device. The interface between the hardware storage device and the device driver includes status information which is used for the prediction of storage device failures. The management application is responsible for reporting the storage device failures. The storage management driver receives storage device failure status from each of the device drivers and propagates the storage device failure status to the management applications.

In accordance with other aspects of the invention, the device drivers and the storage management drivers reside in kernel mode and the management applications reside in user mode.

In accordance with still other aspects of the invention, WMI extensions to WDM provider is also included. The storage management driver propagates the storage device failure status information to the management applications via the WMI extensions to WDM provider. A portion of the WMI extensions to WDM provider resides in kernel mode and a portion of the WMI extensions to WDM provider resides in user mode. Alternatively, a failure prediction agent residing in user mode may be included in lieu of the WMI extensions to WDM provider.

In accordance with yet other aspects of the invention, storage device failure information is transmitted from a device driver to the storage management driver. The storage management driver then determines whether storage device failure status information should be propagated. If the storage management driver determines that storage device failure status information should be propagated, it propagates the storage device failure information to the management applications.

In accordance with still further aspects of the invention, a management application transmits a request for storage failure status information to at least one of the device drivers via the storage management driver. The storage device failure status information is determined and propagated to the management application via the storage management driver.

In accordance with another aspect of the invention, a display is included for a user to view the storage device failure status information.

In accordance with still other aspects of the invention, a device driver may include a failure prediction filter driver. A failure prediction filter driver can perform statistical analysis in order to determine whether to report a storage failure and/or it may send standard and/or proprietary commands (i.e., those commands that do not conform to the SMART specification be they of a standard other than SMART or hardware device specific, respectively) directly to a hardware device if the hardware device itself can determine if failure is being predicted.

In accordance with yet other aspects of the invention, a method is provided for uniform prediction and reporting of storage device failures. The method "queries" at least one storage device for status information using a procedure that is uniform for a variety of storage devices. The "querying" of a storage device can be at the request of a storage management driver or at the request of a management application. A determination is made whether a storage failure error should be reported based on the storage device status information. If it is determined that a storage failure should be reported, the storage failure error is reported.

In accordance with further aspects of the invention, the variety of storage devices about which storage failures are reported includes those SCSI devices and ATA/ATAPI devices that support SMART. The variety of devices can also include other storage devices, such as RAM disks, CD-ROMs, DVD ROMs, tape storage devices, and other types of disk drives that do not follow SMART standards. The method of "querying" the device is dependent on the type of device. For example, a SMART SCSI device is "queried" by examining the sense codes returned by an Input/Output (I/O) operation, such as a read or write, and a SMART ATA/ATAPI device is "queried" using a SMART Read Status command.

In accordance with still further aspects of the invention, the method of predicting and reporting storage device failures can be performed repeatedly. This repeated performance can be based on a timed interval. Predicting and reporting storage device failures can also be performed based on a request, such as at boot or based on a user request.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A and 3B are a flow diagram illustrating the overall logic for predicting hardware storage failures;

DETAILED DESCRIPTION OF THE PREFERRED EMBODIMENT

Figure 1:
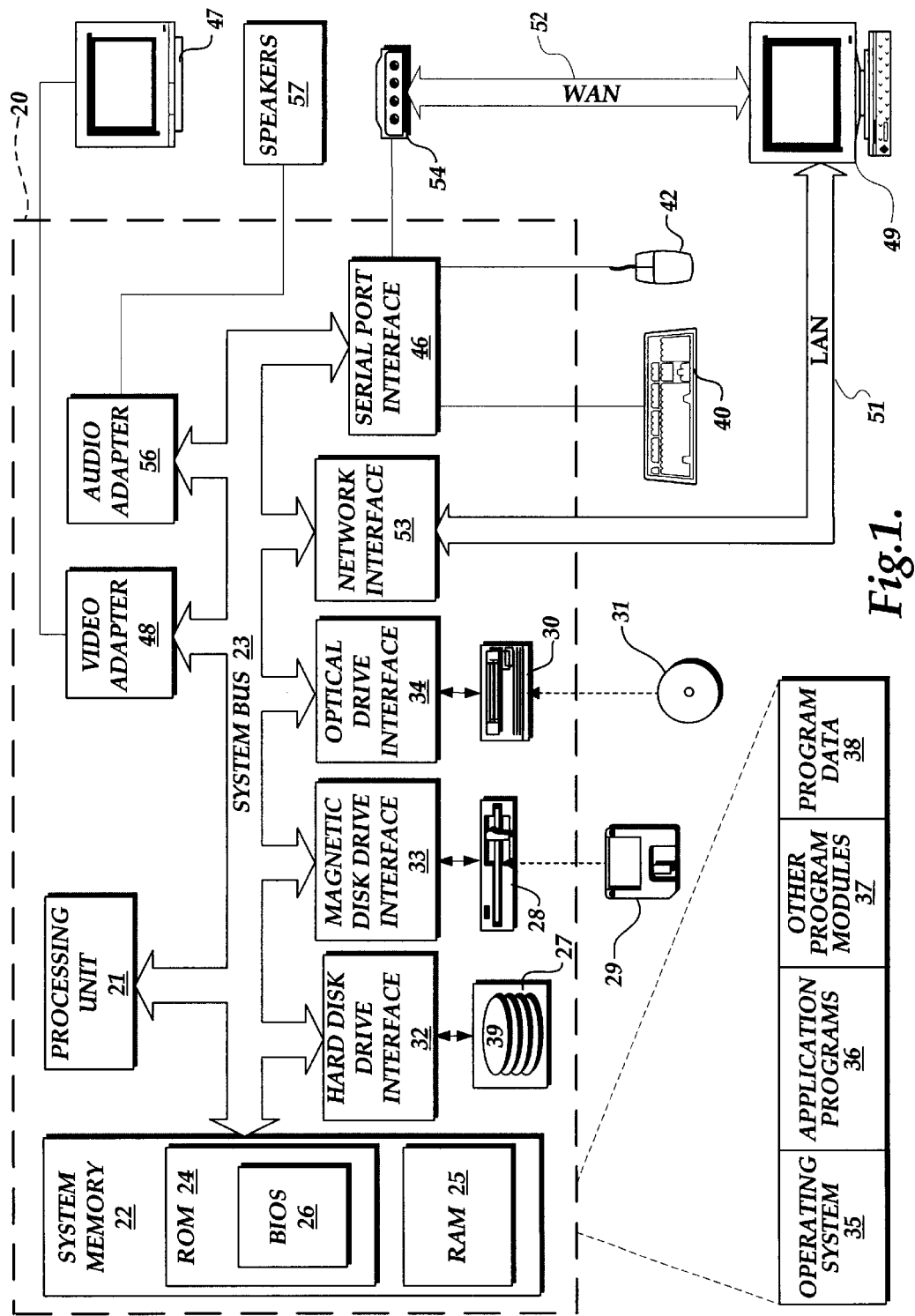
FIG. 1 is a block diagram of a general purpose computer system suitable for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 39, a magnetic disk drive 28 for reading from or writing to a removable magnetic disk 29, and an optical disk drive 30 for reading from or writing to a removable optical disk 31, such as a CD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

Figure 2A:
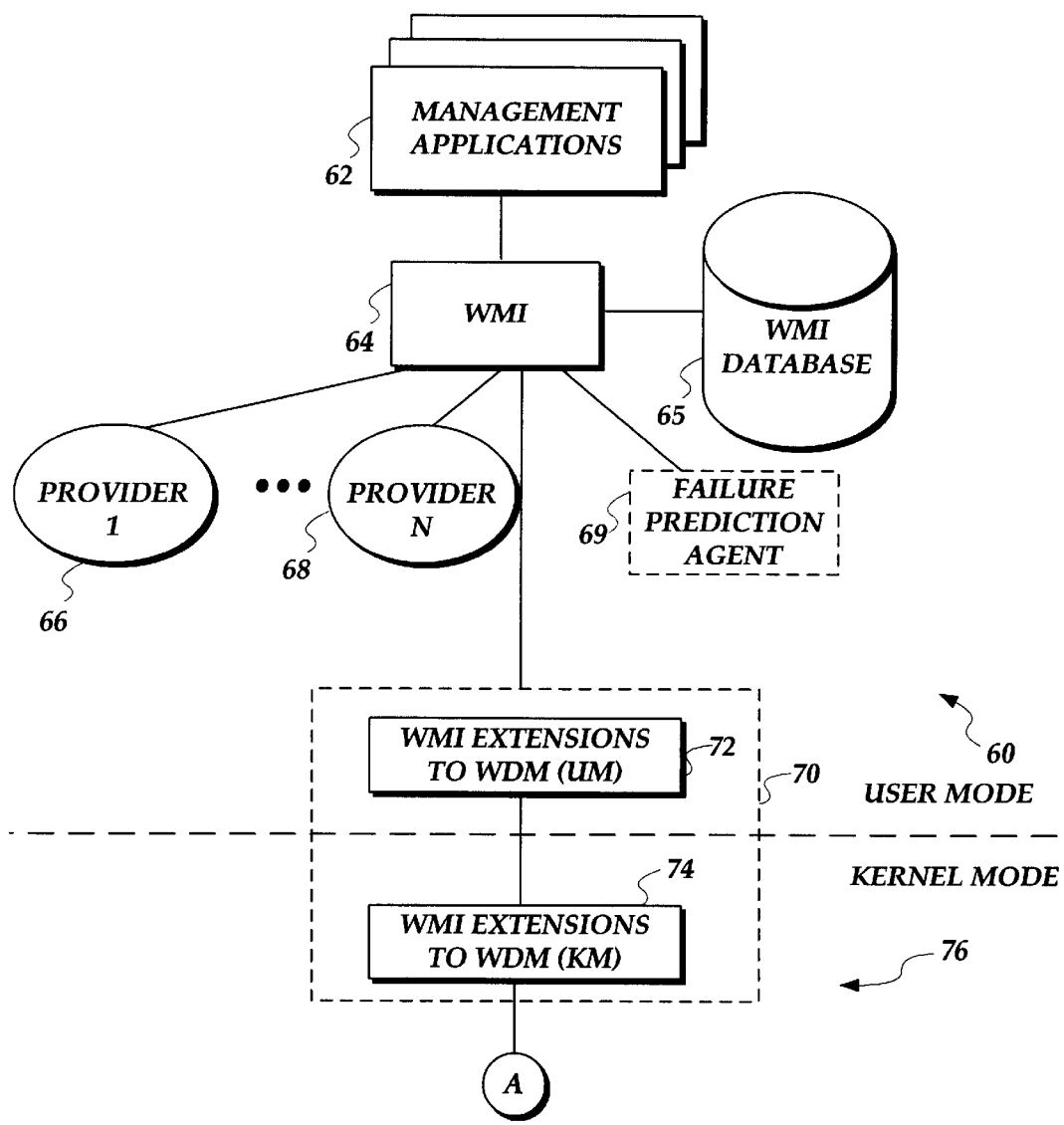
FIGS. 2A and 2B are an architecture diagram suitable for implementing the present invention.
Figure 2B:
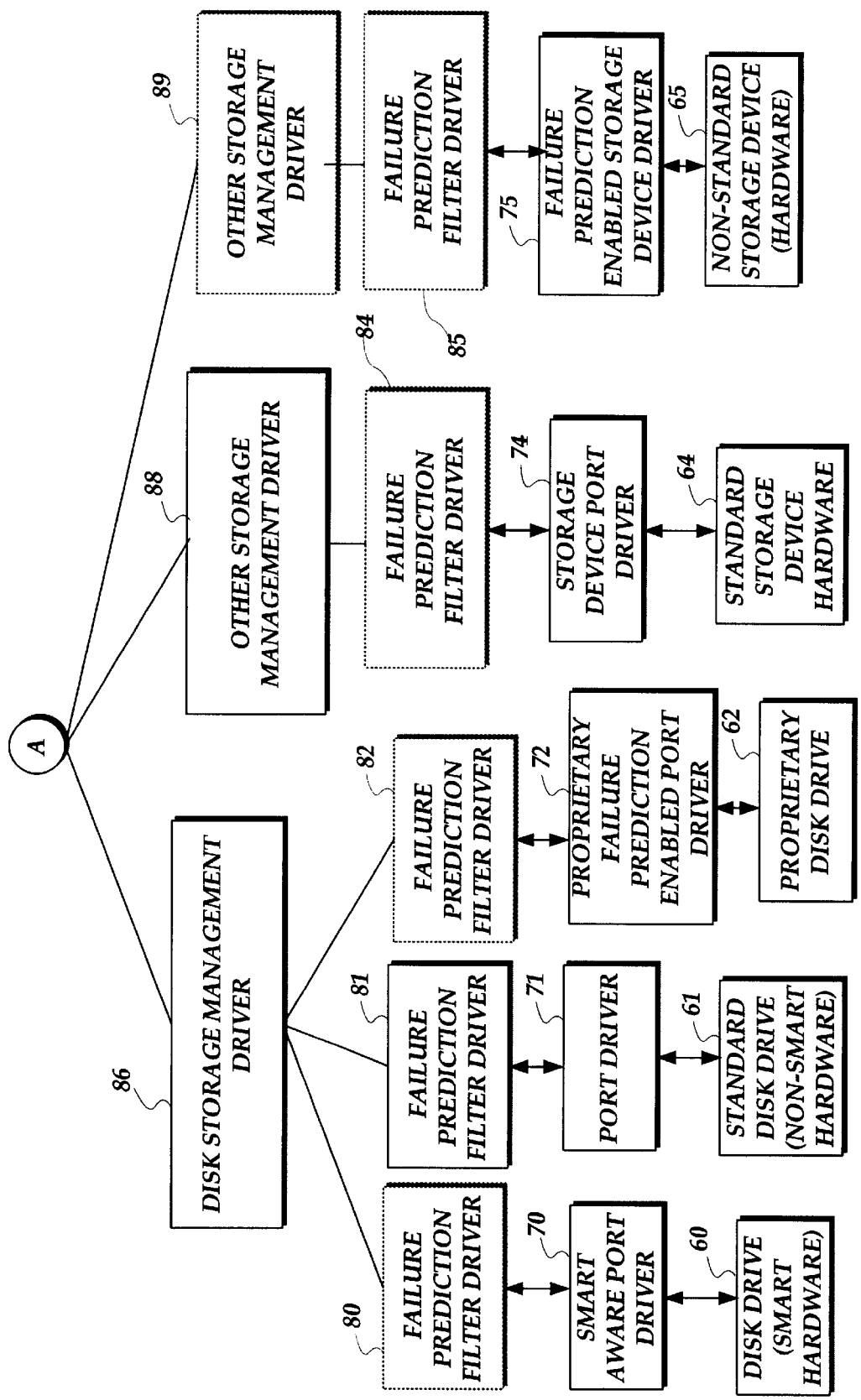

The present invention is embodied in the system memory 22 of the computing environment of FIG. 1. FIGS. 2A and 2B are an architecture diagram illustrating the key components of an exemplary system for implementing the invention on a computer system such as the one illustrated in FIG. 1. FIGS. 2A and 2B illustrate a management system that includes multiple management applications 62 executing in a user mode 60. The management system may be any CIM schema compliant management system, such as the WMI management system. Although embodiments of the present invention may be described here in cooperation with the WMI management system, the present invention is equally applicable to other management systems. Reference here to the WMI management system is for illustrative purposes only, and does not limit the applicability of the invention.

Interfacing with the management applications 62 is a WMI agent 64. The WMI agent 64 maintains and provides access to a WMI store 65, which is a database containing management information exposed by the management system. The management information contained in the WMI store 65 comes from multiple providers, such as components 66 and 68. When the WMI agent 64 receives a request from a management application 62, for information that is not available in the WMI store 65, or for notification of events that the WMI agent does not support, the WMI agent forwards the request to an appropriate provider. The provider then supplies the information or event notification requested.

One such provider is the WMI extensions to Windows Driver Model (XWDM) provider (the "WMI provider") 70. The WMI provider 70 includes two parts: a user mode portion of the WDM provider 72 and a kernel mode portion of the WDM provider 74. The user mode driver 72 communicates with the kernel mode driver 74 in order to pass messages between user mode 60 and kernel mode 76. Thus, the WMI provider 70 allows devices to make management information available to management applications 62 by providing a pipeline between user mode 60 and kernel mode 76.

Kernel mode 76, as shown in FIG. 2B, includes several hardware devices. The hardware devices shown in FIG. 2B are hardware storage devices, including: SMART disk drives 60, which includes SMART SCSI and SMART ATA/ATAPI disk drives; standard, non-SMART disk drives, which includes SCSI and ATA/ATAPI disk drives 61; proprietary disk drives 62; other standard storage devices 64, for example, tape storage devices, DVD ROMs, CD-ROMs, etc.; and non-standard storage hardware, such as a RAM disk or a RAID controller 65.

Each hardware device has an associated device driver. SMART hardware devices 60 communicate with a SMART aware port driver 70. For example, a SMART SCSI device communicates with a SCSI port driver, and a SMART ATA/ATAPI device communicates with an ATA/ATAPI port driver. Although the current implementation of the SMART specification only supports SCSI and ATA/ATAPI devices, if other devices are implemented as SMART devices in the future, the invention shown and described can accommodate additional SMART devices in the same manner as the currently supported SMART devices. Standard, non-SMART disk drives 61 communicate with a port driver 71. Proprietary disk drives 62 communicate with a proprietary failure prediction enabled port driver 72. Other standard storage devices 64, such as tape storage devices, CD-ROMs, and DVD ROMs, communicate with a storage device port driver 74. Similarly, non-standard, or proprietary, storage devices, such as a RAID controller or a RAM disk 65 communicate with a failure prediction enabled storage device driver 75 or a proprietary port driver 72.

A device driver may have an associated failure prediction filter driver. SMART hardware devices 60, e.g., SMART SCSI drives and SMART ATA/ATAPI drives, do not require a failure prediction filter driver, however, a failure prediction filter driver 80 may optionally be included. Standard, non-SMART hardware devices 61, such as a non-SMART SCSI drive or a non-SMART ATA/ATAPI drive, require a failure prediction filter driver 81. Non-standard, proprietary, disk drives 62 may optionally communicate with a failure prediction filter driver 82. Standard devices other than SCSI and ATA/ATAPI devices, such as tape drives, DVDs, and CD-ROMs may optionally include a failure prediction filter driver 84. Failure prediction filter drivers are described in greater detail in the discussion accompanying FIG. 4, below.

The device drivers for SMART devices generally interface with a storage management driver 86, e.g., disk.sys. Device drivers for SMART devices, such as SMART SCSI and SMART ATA/ATAPI devices, can perform the functions generally performed by the storage management driver, e.g., disk.sys. The device driver of a SMART device or a proprietary device can communicate directly with the storage management driver 86 or via a failure prediction filter driver 80, 82, respectively. The device drivers associated with standard, non-SMART devices communicate with the storage management driver 86 via a failure prediction filter driver 81. Other devices, i.e., devices that do not adhere to the SMART standard, such as tape storage devices, DVD ROMs and CD-ROMs, can also interface with a storage management driver 88. These devices may communicate with the storage management driver 88 via a failure prediction filter driver 84. Other proprietary storage devices 65, such as a RAM disk, may or may not interface with a storage management driver 89. If a proprietary storage device does interface with a storage management driver 85 then the proprietary storage device can have a failure prediction filter driver that reports the failure predictions to the storage management driver. A failure prediction filter driver can be used to send a proprietary request to the hardware for a hardware device that does not conform to the SMART specification, for example, a RAID controller. Alternatively the proprietary device can have a failure prediction enabled port driver that interfaces directly with the WMI provider. A third possibility is a device driver that does not communicate with a storage management driver 89 and must perform the responsibilities that would otherwise be performed by the storage management driver, including: file system access, polling at a specified time interval, and exposing WMI classes for failure prediction. This driver can also communicate directly with the WMI Provider.

Another embodiment of the invention includes a failure prediction agent 69 in user mode 60. This agent is used in lieu of the WDM provider 70 described above. This agent could perform all of the work in user mode, for example by accessing device information using public or private APIs.

The implementation of the invention extends existing SMART functionality. This embodiment of the invention makes use of the following new global universal identifications (GUIDs) which are associated with WMI classes in the Windows WMI schema: (1) read failure predict status; (2) read failure predict data; (3) failure predict event; and (4) perform failure predict function. The perform failure predict function GUID has the following five methods associated with it: (1) enable/disable hardware failure prediction; (2) enable/disable failure prediction polling; (3) enable/disable performance degradation for better prediction; (4) get failure prediction mechanism (e.g., SMART IOCTL, SCSI SMART, and IOCTL for filter drivers); and (5) enabling off-line diagnostics (ATA/ATAPI only).

Figure 3A:
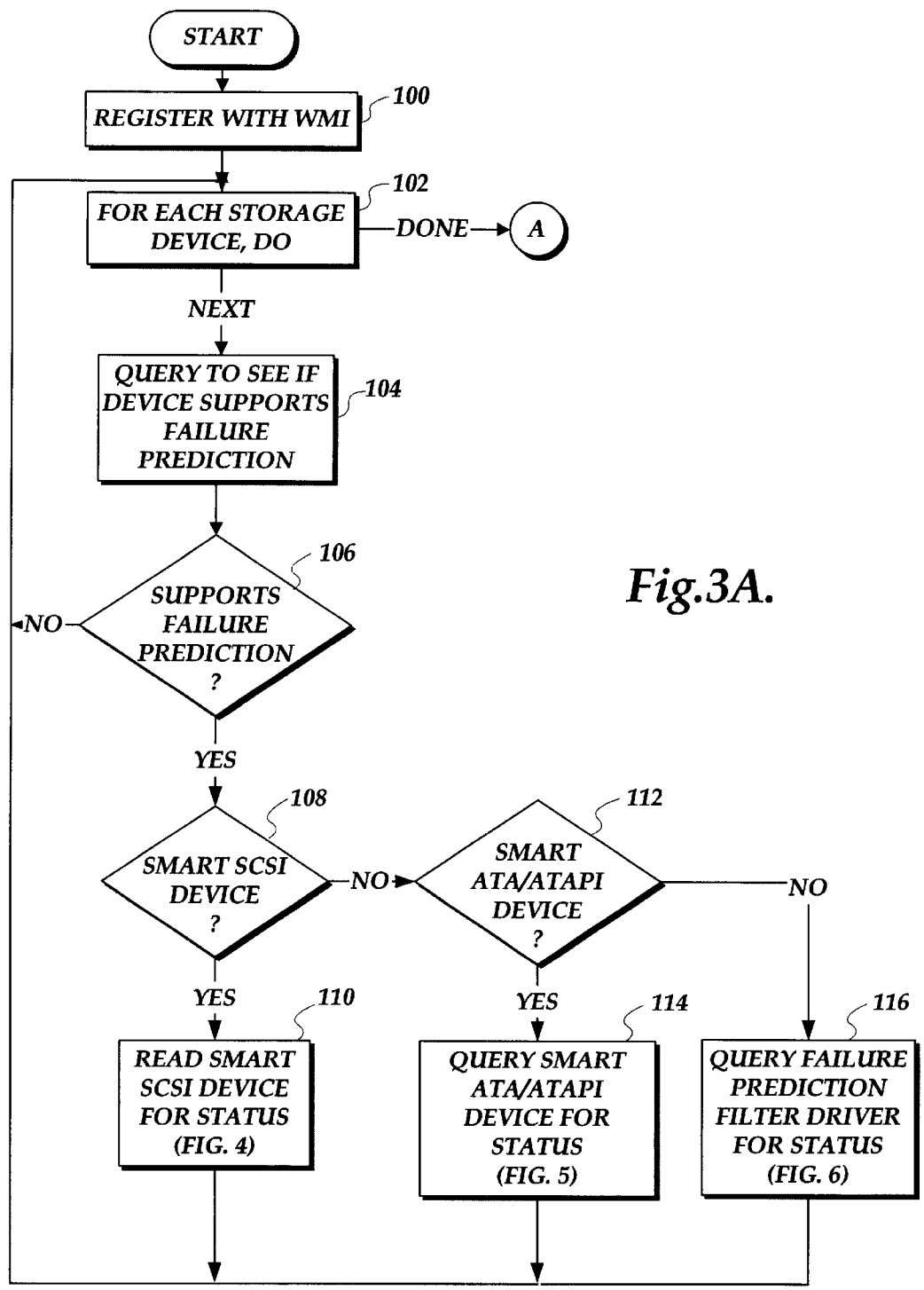

FIGS. 3A–6 are flow diagrams illustrating one embodiment of a process for carrying out the invention. FIGS. 3A–3B are a flow diagram illustrating the overall logic of this embodiment. The logic of the flow diagrams classifies devices into three categories: SMART SCSI devices, SMART ATA/ATAPI deices and non-SMART devices. Since the invention extends SMART functionality, as described above, the rationale for describing the invention based on these categories is based on the fact that SMART SCSI and SMART ATA/ATAPI devices are currently the only supported SMART devices. The embodiment described herein is implemented using the WDM provider 70.

The logic of FIG. 3A moves from a start block to block 100 where registration with the WMI component is performed. Preferably, this is through an API call. Next, initialization for each storage device is performed beginning at block 102. For each storage device, a "query" is performed to determine if the device supports failure prediction. See block 104. This can be accomplished by examining the device type to determine whether the device type is SCSI. If so, a hardware command is sent to the disk to try to enable Informational Exceptions reporting. If this succeeds, the device is a SMART SCSI device. If the device type is ATA/ATAPI, the ATA/ATAPI IDENTIFY information contains a flag indicating whether the device supports SMART. If the device type is neither SCSI nor ATA/ATAPI, a failure prediction IOCTL is sent to the device. A successful completion indicates that the device stack includes a failure prediction filter driver.

The logic then moves to decision block 106 where a test is made to determine if the device supports failure prediction. If so, the logic moves from decision block 106 to decision block 108 where a test is made to determine if the device is a SMART SCSI device. If so, the logic moves to block 110 where a read is sent to the SMART SCSI device, and the resultant sense codes are interpreted to determine if a failure is being predicted, as illustrated in detail in FIG. 4, and described later.

If the device is not a SMART SCSI device, the logic moves from decision block 108 to decision block 112 where a test is made to determine if the device is a SMART ATA/ATAPI device. If so, the logic moves to block 114 where the SMART ATA/ATAPI device is queried for status, as illustrated in detail in FIG. 5, and described later. If the device is neither a SMART SCSI device nor a SMART ATA/ATAPI device, the device may be a device with a failure prediction filter driver, and the logic moves from decision block 112 to block 116 where the failure prediction filter driver is "queried" for status, as illustrated in detail in FIG. 6, and described later. After sending a read to the SMART SCSI device and interpreting the resultant sense code for failure prediction status 110, querying the SMART ATA/ATAPI device for status 114, "querying" the failure prediction filter driver for status 116, or if the device does not support failure prediction (no in decision block 106), the logic returns to block 102 where the processing of blocks 102-116 is repeated for the next device.

When all of the devices have been processed, the logic moves to decision block 120 (FIG. 3B) where a test is made to determine if it is time to exit. For example, an exit signal may be received if the computer is being shut down. It will be appreciated that the logic shown allows for continuous monitoring for the prediction of storage device failures.

If it is not time to exit, the logic moves to decision block 122 where a test is made to determine if it is time to check for storage device failures. Checking for storage device failures can be performed on a timed bases, e.g., every hour, or on a request basis, such as at boot or by user request.

Figure 4:
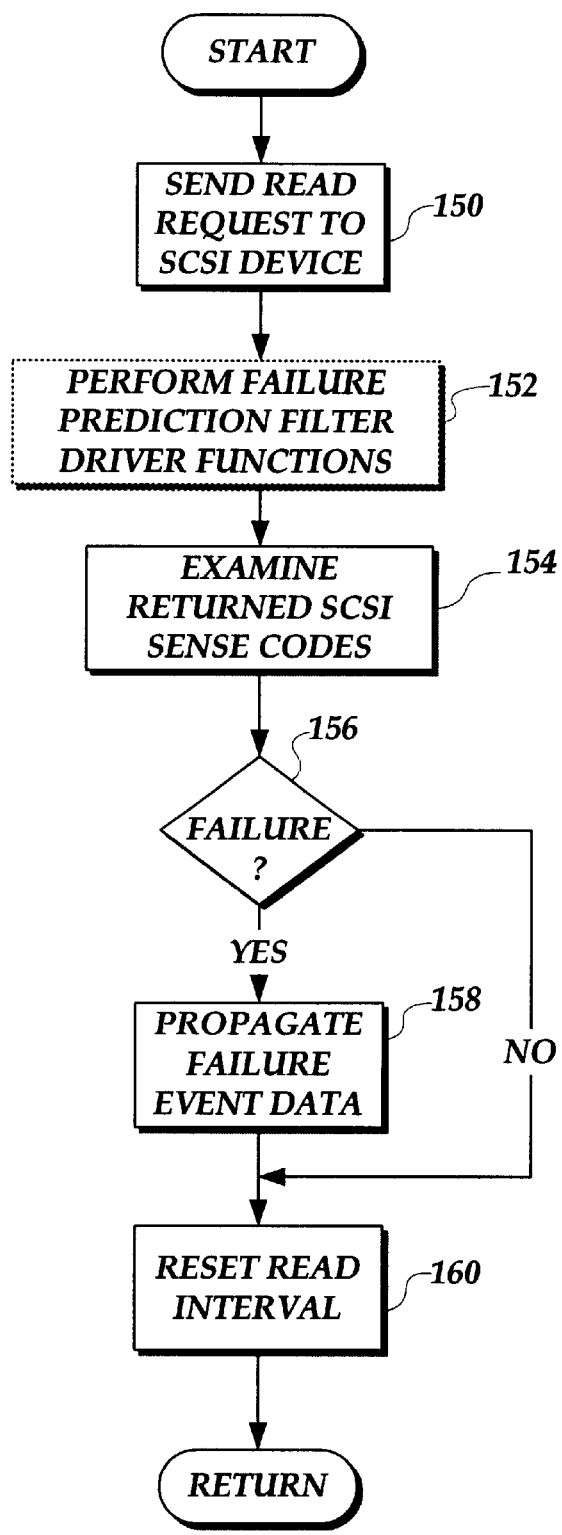
FIG. 4 is a flow diagram illustrating the logic of reading a SMART SCSI device for status.
Figure 5:
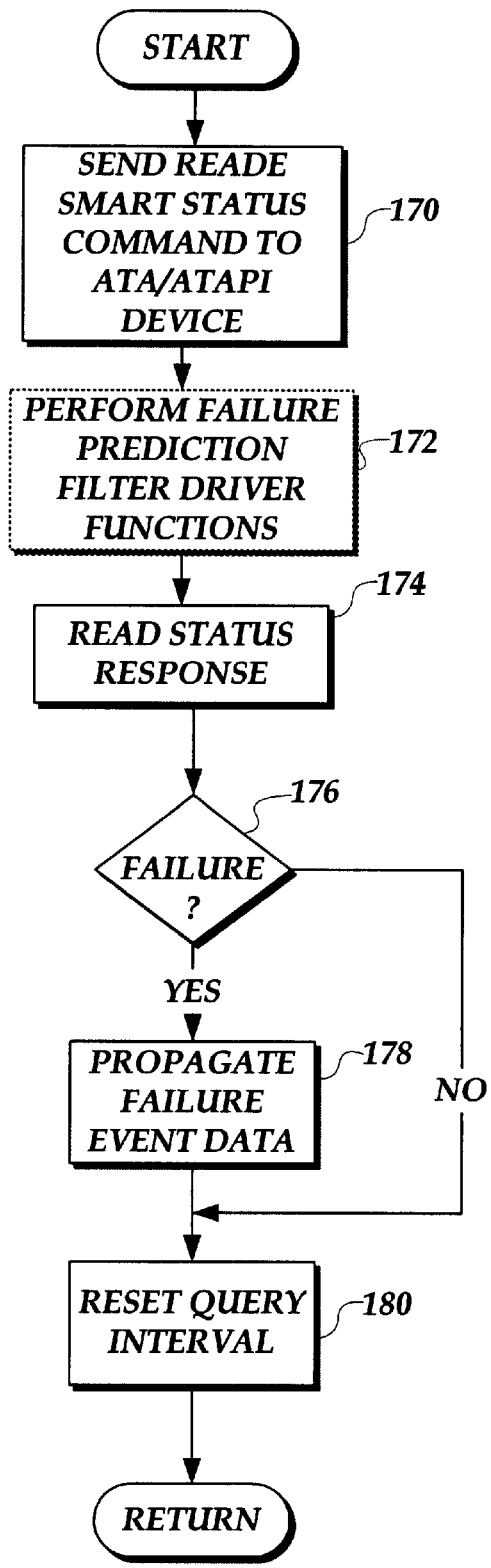
FIG. 5 is a flow diagram illustrating the logic of polling a SMART ATA/ATAPI device for status.
Figure 6:
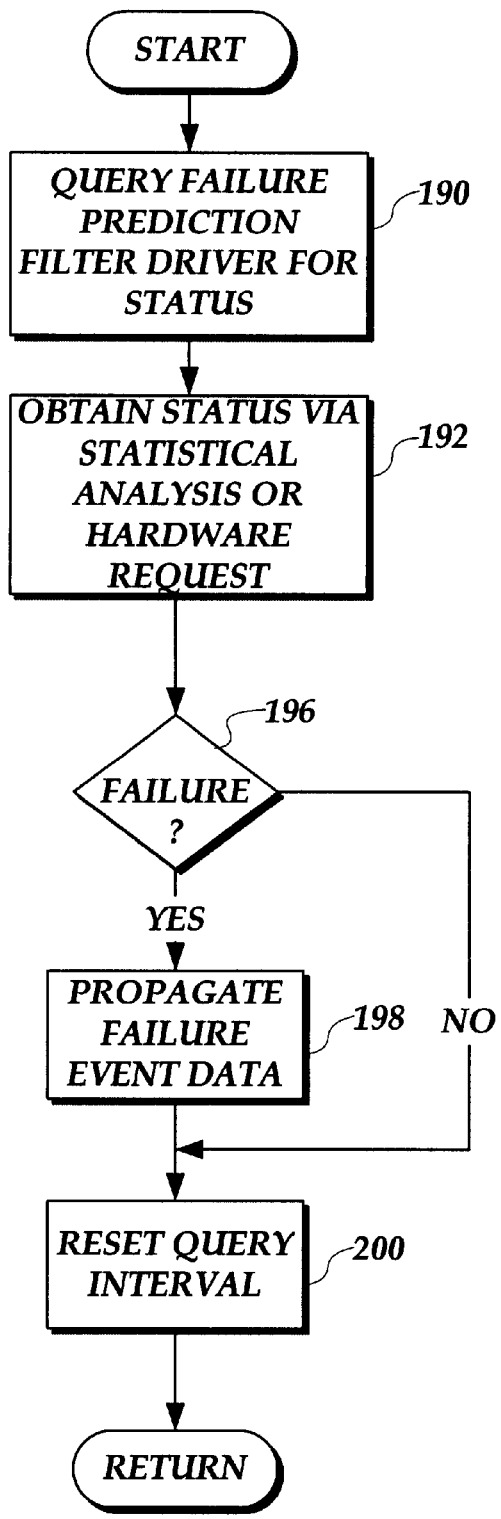
FIG. 6 is a flow diagram illustrating the logic of "querying" a non-SMART device for status.

Preferably, an interrupt is used to signal that it is time to check for storage device failures. If it is time to check for storage device failures, the logic moves to decision block 124 where a test is made to determine if the device to be checked is a SMART SCSI device. If so, the logic moves to block 126 where a read is sent to the SMART SCSI device so that the resultant sense code can be interpreted to obtain a failure prediction status, as illustrated in FIG. 4 and described later. If not, the logic moves to decision block 128 where a test is made to determine if the device to be checked is a SMART ATA/ATAPI device. If so, the logic moves to block 130 where the SMART ATA/ATAPI device is queried for status, as illustrated in FIG. 5 and described later. If it is time to check for a storage device failure on a device that is neither a SMART SCSI device nor a SMART ATA/ATAPI device, the logic moves to block 132 where a failure prediction filter driver is "queried" for status, as illustrated in FIG. 6 and described later.

If it is not time to check for storage device failure ("no" in decision block 122) or after a SMART SCSI device has been sent a read so that the resultant sense code can be interpreted for status 126, a SMART ATA/ATAPI device has been queried for status 130, or a failure prediction filter driver has been queried for status 132, the logic returns to decision block 120 where the test is repeated to determine if it is time to exit. The processing of blocks 120–132 is repeated until it is time to exit, at which point the logic of FIGS. 3A and 3B ends.

FIG. 4 illustrates in detail the logic of reading a SMART SCSI device for status. The logic of FIG. 4 moves from a start block to block 150 where a read request is sent to the SCSI device. The disk storage management driver 86, disk.sys, is capable of communicating directly with a SCSI device. SCSI devices typically do not have a query SMART status command, therefore, a read may be performed in order to obtain a sense code which can be interpreted to determine the failure prediction status. A read can be sent specifically for this purpose. Alternatively, any time the SCSI device performs I/O for any purpose, the resultant sense code can be interpreted in order to determine if there is a potential storage device failure that should be reported.

Next failure prediction filter driver functions can optionally be performed. See block 152. These functions are performed by the optional failure prediction filter driver 80. For example, statistical analysis can be performed by a failure prediction filter driver 80. Statistical analysis can alter the determination of whether a storage device failure should be reported. For example, if the number of retries is increasing linearly, a failure may be reported. Another example of using a failure prediction filter driver is that failures should be reported much sooner for a critical system, such as that used by an airline, than for a non-critical system, such as a home computer system. A failure prediction filter driver can also be used to report failures for devices that do not provide status information. For example, a disk may not provide status information, however the type of disk in question may historically experience storage device errors after a certain amount of use, for example after 5,000 hours of use. A failure prediction filter driver can track the amount of usage and report potential storage errors after 5,000 hours.

Next, the logic moves to block 154 where the sense code is interpreted. It will be appreciated that some failure prediction filter driver functions 152 can be performed after interpreting the sense code in addition to, or instead of performing failure prediction filter driver functions 152 before interpreting the sense code 154. The logic then moves to decision block 156 where a test is made to determinate if a storage device failure should be reported. If so, failure event data is propagated to the management application 62. Preferably, this is done through the use of an API call. If there is not a storage device failure event to propagate, or after the event is propagated, the logic moves to block 160 where the read interval is reset. For example, if the device is read once an hour to check for storage device failures, the interval is reset for the next hour. This allows for continued monitoring of the storage device for potential storage errors that should be reported. This interval is used in order to determine whether it is time to check for storage device failures in block 122 of FIG. 3B. The logic of FIG. 4 then ends and processing returns to FIG. 3A or FIG. 3B.

FIG. 5 illustrates in detail the logic of querying a SMART ATA/ATAPI storage device for status. The logic of FIG. 5 moves from a start block to block 170 where a Read SMART Status command is sent to the SMART ATA/ATAPI storage device. Unlike SCSI devices, the storage management driver 86 disk.sys can not communicate directly with the ATA/ATAPI device. The logic for obtaining status from an ATA/ATAPI device is divided between the disk storage management device 86, e.g., disk.sys, and the ATA/ATAPI port driver 80 or 81.

The logic then moves to block 172 where failure prediction filter driver functions may be performed by a failure prediction filter driver 81. Next, in block 174, the status response is read. It will be appreciated that some failure prediction filter driver functions 172 can be performed after reading the status response in addition to, or instead of performing failure prediction filter driver functions 172 before reading the status response 174. The logic then moves to decision block 176 where a determination is made whether there is a SMART ATA/ATAPI storage device failure that should be reported. If so, failure event data is propagated to the management application 62 in block 178. If there was not a failure to report, or after the event is propagated, the logic moves to block 180 where the query interval is reset. The logic of FIG. 5 then ends, and processing returns to FIG. 3A or FIG. 3B.

FIG. 6 illustrates the logic of "querying" a non-SMART device that has a failure prediction filter driver. The logic moves from a start block to block 190 where a failure prediction filter driver device is "queried" for status. The method for determining if failure is predicted for the device is dependent upon the type of device. For example, the device may be queried similar to a SMART ATA/ATAPI device, or a read may be required, similar to a SMART SCSI device, or any other acceptable method as defined by the manufacturer of the device. Examples of these storage devices include RAM disks, CD-ROMs, DVD ROMs, and tape storage devices. It will be appreciated that the foregoing examples are illustrative, and other types of devices may be included.

The logic then moves to block 192 where information may be obtained from the device hardware. Based upon this information or other information maintained by the failure prediction filter driver, a determination of the failure prediction status is made. A storage management driver 88 may query the filter driver in order to obtain failure prediction information that is maintained within the failure prediction driver 84. The failure prediction driver can employ various mechanisms, for example, statistical analysis, in order to determine the failure prediction information. The storage management driver 88 may also query the failure prediction filter driver so that the failure prediction filter driver can perform a hardware request to a storage device 64. The failure prediction filter driver 84 interprets the results and determines whether a failure is being predicted. The interpretation could be determined using a variety of mechanisms, for example, statistical analysis, breaches of predetermined thresholds, or propagating a fail/no fail result.

The logic then moves to decision block 196 where a test is made to determine whether there is a storage failure to report for the device. If so, the logic moves to block 198 where failure event data is propagated to the management application 62. If there is no information to report to the management application 62, or after the information is reported, the logic moves to block 200 where the query interval for the device is reset. The logic of FIG. 6 then ends and processing returns to FIG. 3A or FIG. 3B.

Alternatively, a failure prediction enabled storage driver 75 or a failure prediction port driver 72, as described above, can communicate directly with the WDM provider 70 instead of via a storage management driver. In this case the failure prediction enabled storage driver and the failure prediction port driver can use any mechanisms available to them to determine the failure prediction status.

It will be readily appreciated by those skilled in the art that the logic of FIGS. 4, 5 and 6 is similar. One relevant difference between these figures is that the method for obtaining storage device failure information is device specific.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A computer-readable medium having computer-executable components for a standardized method of predicting storage device failures, said components comprising:
   (a) at least one device driver component having an interface to a storage device;
   (b) at least one storage management driver component operative to receive storage device failure status information from said at least one device driver; and
   (c) at least one management application component operative to execute upon a host system, wherein said at least one storage management driver component propagates the storage device failure status information from said at least one device driver to said management application component.

2. The computer-readable medium of claim 1, wherein:
   (a) said device driver component and said storage management driver component reside in a kernel mode; and
   (b) said management application component resides in a user mode.

3. The computer-readable medium of claim 1, further comprising a management system instrumentation provider component, wherein said storage management driver component propagates the storage device failure status information from said device driver component to said management application component via said management system instrumentation provider component.

4. The computer-readable medium of claim 1, wherein the storage device is a SMART SCSI device.

5. The computer-readable medium of claim 1, wherein the storage device is a SMART ATA/ATAPI device.

6. The computer-readable medium of claim 1, wherein the storage device is a non-SMART storage device.

7. The computer-readable medium of claim 6, wherein the non-SMART storage device is a selected one from a group comprising a tape storage device, a CD-ROM, a DVD ROM, and a RAM disk.

8. The computer-readable medium of claim 3, wherein said management system instrumentation provider component is Windows Management instrumentation extensions to Windows Driver Model.

9. The computer-readable medium of claim 8, wherein:
   (a) a first portion of the Windows Management Instrumentation extensions to Windows Driver Model resides in a kernel mode; and
   (b) a second portion of the Windows Management Instrumentation extensions to Windows Driver Model resides in a user mode.

10. The computer-readable medium of claim 1, further comprising a failure prediction agent, wherein the failure prediction agent resides in a user mode.

11. The computer-readable medium of claim 1, further comprising a display component, wherein said display component provides a mechanism for a user to view the storage device failure status information.

12. The computer-readable medium of claim 1, further comprising at least one failure prediction filter driver component, wherein said failure prediction filter driver component interfaces with said device driver component.

13. The computer-readable medium of claim 12, wherein said failure prediction filter driver component comprises at least one of the following:
   (a) a statistical analysis component, wherein said statistical analysis component determines whether a storage device failure has occurred; and
   (b) a device communication component, wherein said device communication component sends non-standard and proprietary commands directly to the storage device.

14. A computer implemented method for predicting storage device failures, said method comprising:
   (a) transmitting storage device failure status information from a device driver component to a storage management driver component;
   (b) determining whether the storage management driver component should propagate the storage device failure status information; and
   (c) if the storage management driver component should propagate the storage device failure status information, propagating the storage device failure information to a management application component.

15. The computer-implemented method of claim 14, wherein propagating the storage device failure status information to the management application component comprises propagating the storage device failure status information via a management system instrumentation provider component.

16. A computer implemented method for predicting storage device failures, said method comprising:
   (a) transmitting a request for storage device failure status information, wherein the request is transmitted by a management application component to at least one device driver component via a storage management driver component;
   (b) determining the requested storage device failure status information; and
   (c) propagating the storage device failure status information to the management application component via the storage management driver component.

17. The computer-implemented method of claim 16, wherein said computer implemented method accomplishes said propagating the storage device failure status information comprises propagating the storage device failure status information via a Windows Management Instrumentation extensions to Windows Driver Model component.

18. A computer implemented method for predicting storage device failures, said method comprising:
   (a) querying at least one storage device connected to a host computer for status information using a procedure that is uniform for a variety of storage devices connected to the host computer;
   (b) determining if a storage failure error should be reported based on the storage device status information; and
   (c) if the storage failure error should be reported, reporting the storage failure error.

19. The computer implemented method of claim 18, wherein the variety of storage devices comprises SMART SCSI devices and SMART ATA/ATAPI devices.

20. The computer implemented method of claim 18, wherein the variety of storage devices comprises a non-SMART device.

21. The computer implemented method of claim 20, wherein the non-SMART device is a selected one from a group comprising: a tape storage device, a CD-ROM, a DVD ROM, and a RAM disk.

22. The computer implemented method of claim 18, wherein querying the storage device comprises:
   (a) querying the storage device based on the type of device, wherein a SMART SCSI device is queried by sending a read request and interpreting a resultant sense code, a SMART ATA/ATAPI device is queried using a read SMART status command, and a non-SMART device query is determined based on the specific type of device; and
   (b) determining the storage device status information based on a result returned from the query.

23. The computer implemented method of claim 18, further comprising performing a statistical analysis to determine if a storage failure error should be reported.

24. The computer implemented method of claim 18, further comprising repeating (*a*)–(*c*) in response to a triggering event.

25. The computer implemented method of claim 24, wherein the triggering event is an expiration of a time interval.

26. The computer implemented method of claim 24, wherein the triggering event is a request.

\* \* \* \* \*

UNITED STATES PATENT AND TRADEMARK OFFICE
CERTIFICATE OF CORRECTION

PATENT NO. : 6,460,151 B1
DATED : October 1, 2002
INVENTOR(S) : A.M. Warwick et al.

It is certified that error appears in the above-identified patent and that said Letters Patent is hereby corrected as shown below:

Title page,
Item [56], References Cited, OTHER PUBLICATIONS, "—Monitoring," should read -- Monitoring, --

Item [74], *Attorney, Agent, or Firm* "Christensen," should read -- Christensen --

Signed and Sealed this

Twenty-ninth Day of April, 2003

JAMES E. ROGAN
*Director of the United States Patent and Trademark Office*